INVENTORS
Edgar Wolf
Francis C. Marino
BY Yuter + Spiecens
ATTORNEYS 3,408,572

CONTROLLED AMPLITUDE FREQUENCY SHIFT SIGNAL GENERATOR

Edgar Wolf, New Hyde Park, and Francis C. Marino, Huntington, N.Y., assignors to Digitronics Corporation, Albertson, N.Y., a corporation of Delaware Filed July 6, 1965, Ser. No. 469,764
9 Claims. (Cl. 325—163)

ABSTRACT OF THE DISCLOSURE

A controlled amplitude signal generator transmits signals shifting between two frequencies to a non-linear device. The controlled amplitude signal generator comprises a signal generating means for generating a signal shifting between two voltage levels which controls the output frequency of a voltage-controlled oscillator. The output of the oscillator is connected to the non-linear device via an attenuator whose attenuation properties are controlled by the signal from the signal generating means. Thus, the signal generating means not only controls the frequency but also the amplitude of signals fed to the non-linear device.

Figure 1:
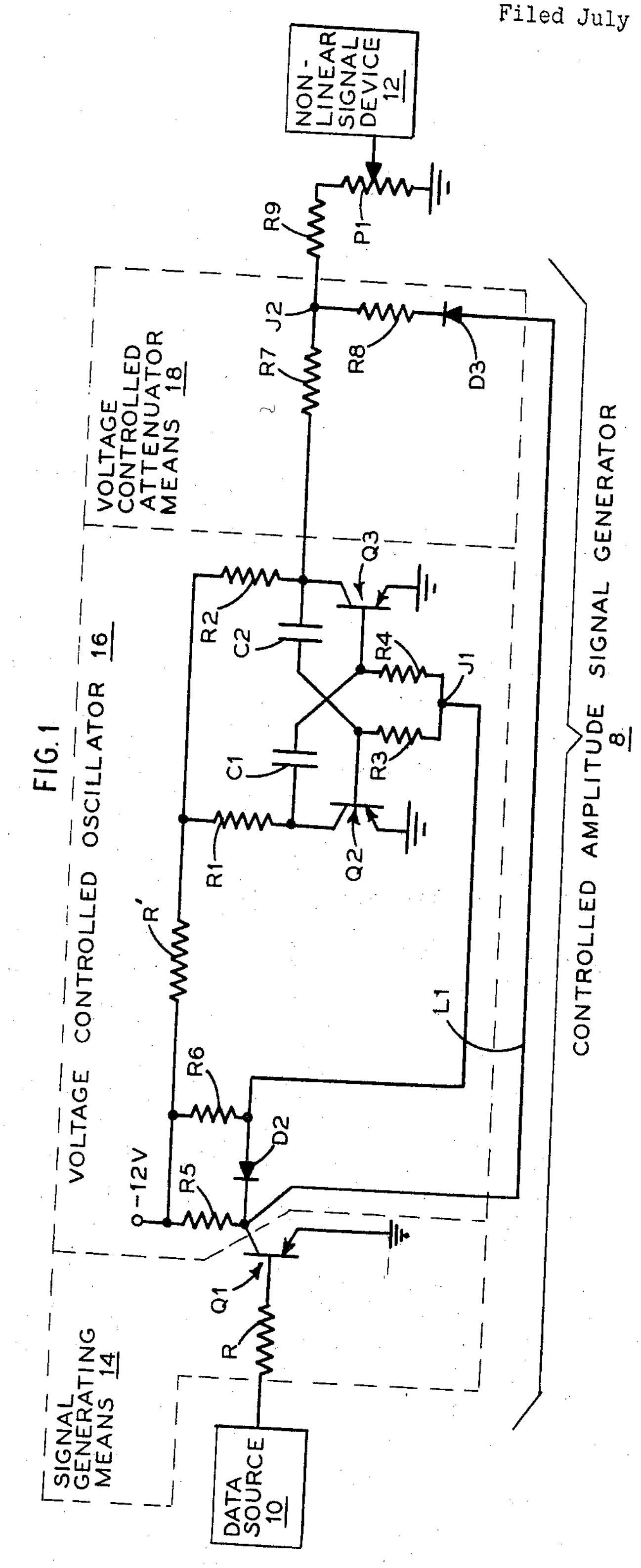

This invention pertains to controlled amplitude signal generators and more particularly to signal generators which generate periodic signals whose amplitude is controlled in accordance with the frequency of the generated signals.

Varying frequency signals have many applications particularly in the communications art. One common use of such signals is with frequency-shift keying systems wherein the signal shifts between first and second frequencies to represent bands or bits of information. Generally, the initial signal representation is by a voltage which switches between two potential levels. However, to enhance reliability and to even utilize the voice channels of conventional telephone networks the amplitude modulated signals are converted to shift-frequency signals. The shift-frequency signals are utilized to generate sound tones. These tones can be fed via a speaker into the microphone portion of a telephone hand set.

It has been found that when such audio coupling is attempted the speaker-to-microphone coupling device has a non-linear frequency response. For example, if a given amplitude signal is fed to the coupling device, it will transmit a first amplitude tone for a first frequency signal and a different amplitude tone for a second frequency signal. Therefore, not only is the tone frequency shifted but it is also amplitude modulated. Such a phenomena causes the unreliable transfer of information. It should also be apparent that the amplitude modulation introduces further frequency components into the tone to further complicate signal detection by receiving apparatus. When such a non-linear frequency response is recognized it is possible to modify the input signal to compensate for the non-linearity.

It is, accordingly, a general object of the invention to provide improved apparatus for generating a frequency-shift signal which is amplitude controlled so that when the signal is fed to a non-linear frequency response signal device the latter transmits a uniform amplitude signal.

It is another object of the invention to provide an improved signal generator which transmits a signal of a first frequency in response to the receipt of a signal having a first potential level and transmits a signal of a second frequency in response to the receipt of a signal having a second potential level wherein the amplitude of the transmitted signals are controlled so that when the transmitted signals are received by a non-linear frequency response signal device, the non-linearity of the latter is compensated.

It is a further object of the invention to satisfy the above objects with apparatus which is on the one hand very simple and inexpensive and on the other hand highly reliable.

Briefly, the invention contemplates a controlled amplitude signal generator for transmitting signals shifting between first and second frequencies to a non-linear signal device. The controlled amplitude signal generator comprises signal generating means for generating a signal shifting between first and second potential levels and a voltage controlled oscillator means connected to the signal generating means. The oscillator means transmits a signal having a first frequency and a given amplitude when the signal generated by the signal generating means is at first potential level and transmits a signal having a second frequency and an amplitude greater than the given amplitude when the signal generated by the signal generating means is at the second potential level.

Other objects, the features and advantages of the invention will be apparent from the following detailed description when read with the accompanying drawings which show, by way of example and not limitation, two embodiments of the invention.

Figure 2:
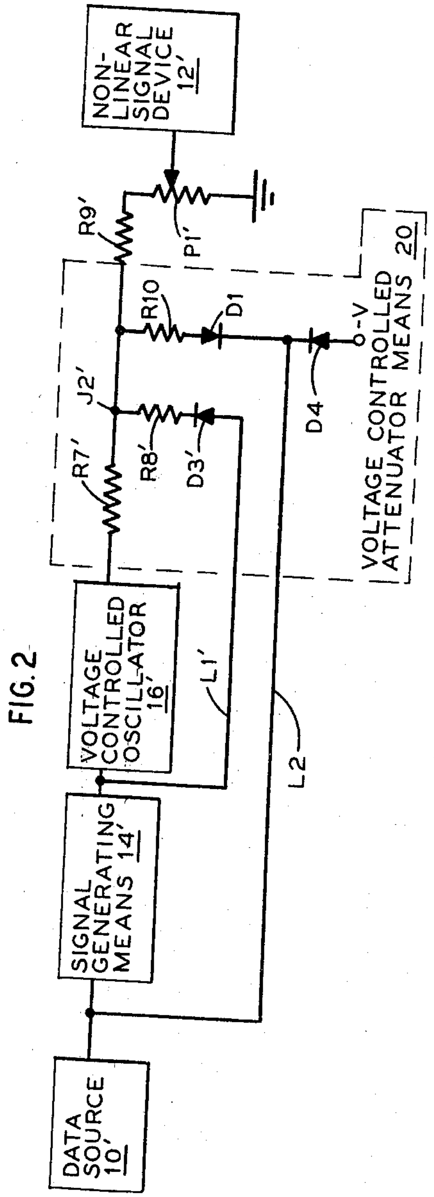

In the drawings:

FIGURE 1 shows one embodiment of the invention employing a particular type of voltage controlled attenuator; and FIGURE 2 shows another embodiment of the invention employing another type of voltage controlled attenuator which does not introduce low-frequency components into the output signal.

Referring now to FIGURE 1, there is shown a controlled amplitude signal generator 8 connecting a data source 10 to a non-linear frequency signal device 12.

Data source 10 can be any source of digitally represented data such as a magnetic tape system wherein the data is represented by signals digitally varying between two voltage levels such as 0 volt and −6 volts. The controlled amplitude signal generator 8 converts this amplitude switching signal to a frequency switching signal. For example, when the data source 10 transmits a 0 volt signal, signal generator 8 transmits a 2100 cycle signal, and when data source 10 transmits a −6 volt signal, signal generator 8 transmits a 1200 cycle signal. Non-linear frequency signal device 12 is any signal utilization device which inherently has a non-linear frequency response. A typical device would be a power amplifier driving a speaker acoustically coupled to the microphone of a telephone handset which is connected into a commercial communications net. Such a device, for example, attenuates to a greater extent the higher frequency signals. Therefore, to insure a uniform output from the non-linear frequency response device 12, the higher frequency input signals must be of greater amplitude than the lower frequency input signals. Controlled amplitude signal generator 8 provides such signals.

Controlled amplitude signal generator 8 includes: a signal generating means 14 which generates a signal shifting between first and second potential levels in response to the signals representing the data from data source 10; a voltage controlled oscillator 16 which generates a first frequency signal or a second frequency signal; and a voltage controlled attenuator means 18 that is binarily or switchably operative. When the signal generating means 14 transmits a signal of a first potential level, say ground potential, voltage controlled oscillator 16 transmits the first frequency signal, say a 1200 cycle per second square wave, and voltage controlled attenuator 18 is operative to attenuate the amplitude of the signal fed from the oscillator to signal device 12. When the signal generating means 14 transmits a signal of a second potential level, voltage controlled oscillator 16 transmits the second frequency signal, e.g. a 2100 cycle per second square wave. Voltage controlled attenuator means 18 is not operative and the signal from oscillator 16 is transmitted unattenuated to signal device 12.

More particularly, signal generating means 14 includes PNP transistor Q1 having a base for receiving signals from data source 10 through a limiting resistor R, a grounded emitter, and a collector which is the output terminal. The output signals to the limiting resistor R causes the base to swing between ground and a negative potential, for the cited example. When the base is at ground potential, transistor Q1 is cut off and its collector swings between −4 and −6 volts. When the base is at a negative potential, transistor Q1 conducts and its collector is at ground potential.

Voltage controlled oscillator 16 is a relaxation oscillator in the form of a symmetrical astable multivibrator. The oscillator 16 comprises two signal amplifiers in the form of PNP transistors Q2 and Q3, each having a base (control electrode), an emitter (common electrode) and a collector (output electrode). An operating potential (ground) is applied to the emitters of both transistors Q2 and Q3 while resistors R1 and R2 are connected respectively to the collectors of transistors Q2 and Q3, and via resistor R′ to source of negative potential −12 v. to apply an operating potential to the collectors. Capacitor C1 connects the collector of transistor Q2 to the base of transistor Q3, and capacitor C2 connects the collector of transistor Q3 to the base of transistor Q2. Resistor R3 connects the base of transistor Q2 to the junction J1, and resistor R4 connects the base of transistor Q3 to junction J1. Resistors R5 and R6 each have a terminal connected to source of negative potential −12 v. Diode D2 (a unilateral conducting device) interconnects the second terminals of resistors R5 and R6. The anode of diode D2 is connected to junction J1, and the cathode of diode D2 is connected to the collector of transistor Q1. Diode D2 is so polarized that when the transistor Q1 is not conducting the diode is conducting and resistors R5 and R6 are connected in parallel between junction J1 and the source of negative potential −12 v.; and when the collector of transistor Q1 is at ground potential, diode D2 is non-conducting and only resistor R6 is connected between junction J1 and the source of negative potential −12 v. The switching in and out of resistor R5 controls the frequency of oscillation of the multivibrator.

As is well known, the frequency of oscillation is dependent in part on the time constants of the components in the base circuits of a transistor type multivibrator. The components in the base circuit of transistor Q2 are resistors R′, R2, R3 and Re (the effective resistor between junction J1 and the source of negative potential −12 v.) and capacitor C2. The time constant is the product of the capacitance of capacitor C2 times the sum of the resistances of resistors R, R2, R3 and R*e*. A similar analysis holds for the base circuit of transistor Q3. When diode D2 is not conducting, the resistance of resistor R*e* is equal to only the resistance of resistor R6, the time constants are of a certain value and the oscillator 16 free-runs at a certain frequency. When diode D2 is conducting the resistance of resistor R*e* is equal to the resistance of the parallel combination of resistors R5 and R6. Consequently, the time constants are smaller and oscillator 16 free-runs at a higher frequency. It should, therefore, be apparent that the potential or voltage of the collector of transistor Q1 (the output of signal generating means 14) controls the frequency of the signal generated by voltage controlled oscillator 16.

The voltage controlled attenuator means 18 includes: a resistor R7 connected betwen the output of oscillator 16 (the collector of transistor Q3) and junction J2 which can be considered the input of signal device 12; a resistor R8 having one terminal connected to junction J2; and diode D3 (a unilateral conducting device) connecting the other terminal of resistor R8 to the collector of transistor Q1. The cathode of diode D3 is connected to resistor R8 and the anode (input terminal) of diode D3 is connected, via line L1, to the collector of transistor Q1. Diode D3 is so polarized that when the collector of transistor Q1 is at ground potential, diode D3 conducts and resistor R8 is returned to ground; when the collector of transistor Q1 is at the −5 volt average potential, diode D3 is cut off and resistor R8 "floats." When resistor R8 is returned to ground, the signal transmitted from the output of oscillator 16 (the collector of transistor Q3) to junction J2 is attenuated by virtue of the potential divider action of resistors R7 and R8. When resistor R8 is floating, there is no attenuation because there is no potential divider action by resistors R7 and R8. In fact, signalwise, resistor R8 does not exist. It should, therefore, be apparent that the potential level of the signal from signal generating means 14 controls the operation of voltage controlled attenuator means 18.

Resistor R9 and potentiometer P1 are provided to initialize the level of the signal fed to non-linear frequency response signal device 12 and can be included in the device or in the attenuator.

While the above described circuit works adequately for most applications, it should be realized that there is a shift or off-set between the D.C. levels of the high frequency and the low frequency square waves, at the output of attenuator means 18, by virtue of their differences in their amplitude. As the output signal swings between the two frequencies a low frequency signal component is added to the overall signal. This low frequency component can be bothersome if the circuits following the attenuator have a very good low frequency response.

In order to present a constant D.C. level for the output signals a system according to FIGURE 2 may be utilized. Since most of the components of FIGURE 2 are identical to the components of FIGURE 1, primed reference characters will be used for like elements and only the differences will be discussed. In fact, the only difference resides in the attenuator, and more specifically in the addition of resistor R10, diode D1 and diode D4. In particular, resistor R10 includes one terminal connected to the junction J2′ and another terminal connected to the anode of diode D1. The cathode of diode D1 is connected to the cathode of diode D4 whose anode is connected to a source of negative voltage −V, substantially equal to about −5 volts for the example given above. The cathodes of diodes D1 and D4 are connected via line L2 to the output of data source 10. Diode D4 acts as a clamping diode to insure that the cathode of diode D1 never falls below the most negative voltage ever present at the anode of diode D3′. This criteria establishes the magnitude of voltage source −V.

In operation, when the higher frequency signal is transmitted from voltage controlled oscillator 16′, the potential on line L1′ is at about −5 volts (as previously described) and the voltage on line L2 is at ground (line L2 is connected to the output of data source 10′). Both of the diodes D1 and D3′ are back-biased causing resistors R8′ and R10 to "float" and the result is no different from that obtained with attenuator 18 of FIGURE 1. However, when the lower frequency component is transmitted from oscillator 16′, line L1′ is at about 0 volt potential and line L2 is at about minus 6 volts potential. Both of the diodes conduct, and resistors R8′ and R10 are connected in parallel, as noted below. There is now established a potential divider which includes resistor R7, and resistors R8′ and R10.

In fact, there is established a network including an equivalent resistor, having a resistance $R_A$ equal to the resistance of the parallel combination of resistors R8′ and R10, and connected between junction J2′ and a voltage source having a magnitude $V_A$. For no D.C. shift when handling square waves, $$V_A=\left(\frac{R_0}{R_7+R_0}\right)\frac{V_{in}}{2}$$

where $R_7$ is the resistance of resistor R7'; $R_0$ is the input resistance of the circuit being driven by attenuator means 20; and $V_{in}$ equals the maximum excursion of the signal from oscillator 16' assuming it transmits square waves which swing from ground potential.

There are two possibilities. If it is possible to freely choose the control voltage $V_C$, i.e., the minimum potential on Lines L1' and L2, it is simplest to make the resistances of resistors R8' and R10 each equal to $$\frac{2GR_{11}}{1-G}$$

where G is the desired amplitude ratio between the attenuated and unattenuated signal; and $$R_{11}=\frac{R_7R_0}{R_7+R_0}$$

($R_7$ and $R_0$ being as previously defined). In which case $$V_C=\left(\frac{R_0}{R_7+R_0}\right)V_{in}$$

where all symbols are as previously defined. On the other hand, for a given $V_C$ and G, the value of the resistances $R_8'$ and $R_{10}$ of resistor R8' and R10 may be determined by the simultaneous solution of the two following equations:

$$\frac{R_{8'}+R_{10}}{R_{8'}}=\frac{R_7+R_0}{R_0}(V_C)$$

and $$\frac{R_{8'}R_{10}}{R_{8'}+R_{10}}=\frac{GR_{11}}{1-G}$$

There has thus been shown an improved controlled amplitude signal generator wherein the potential level of a signal controls both the frequency and amplitude of a signal fed to an inherently non-linear frequency response signal device. The signal generator includes a voltage controlled oscillator which generates a first or a second frequency in response to the first or second potential level of a control signal. In addition, the signal generator includes a voltage controlled attenuator means which is operative or non-operative to control the amplitude of the signal from the oscillator in response to the potential levels of the same control signal.

While only two embodiments of the invention have been shown and described in detail, there will now be obvious to those skilled in the art many modifications and variations which satisfy many or all of the objects of the invention but which do not depart from the spirit thereof, as defined in the claims.

What is claimed is:

1. A controlled amplitude signal generator for transmitting signals shifting between first and second frequencies to a non-linear frequency response signal device comprising signal generating means for generating a signal shifting between first and second potential levels and a voltage controlled oscillator means, connected to said signal generating means, for transmitting a signal having a first frequency and a given amplitude when the signal generated by said signal generating means is at the first potential level and for transmitting a signal having a second frequency and an amplitude greater than said given amplitude when the signal generated by said signal generating means is at the second potential level.

2. For combination with a non-linear frequency response signal device wherein in response to a given amplitude input signal the non-linear frequency response signal device transmits a signal having a first amplitude when the input signal has a first frequency and transmits a signal having a second and lesser amplitude when said input signal has a second frequency, a controlled amplitude input signal generator comprising first means for generating a signal shifting between first and second potential levels, a voltage controlled oscillator means, responsive to said first means, for transmitting a signal having a first frequency when said first means generates a signal having said first potential level and for transmitting a signal having a second frequency when said first means generates a signal having said second potential level, and a voltage controlled attenuator means responsive to said first means and connecting said voltage controlled oscillator means to the non-linear frequency response signal device for limiting the amplitude of the signal having said first frequency received by the latter when said first means generates a signal having said first potential level.

3. The controlled amplitude input signal generator of claim 2, wherein the voltage controlled oscillator means is a free-running relaxation oscillator.

4. For combination with a non-linear frequency response signal device wherein in response to a given amplitude input signal the non-linear frequency response signal device transmits a signal having a first amplitude when the input signal has a first frequency and transmits a signal having a second and lesser amplitude when said input signal has a second frequency, a controlled amplitude input signal generator comprising first means for generating a signal shifting between first and second potential levels, a voltage controlled oscillator means, responsive to said first means, for transmitting a signal having a first frequency when said first means generates a signal having said first potential level and for transmitting a signal having a second frequency when said first means generates a signal having said second potential level, and a voltage controlled attenuator means including a first impedance means connecting said voltage controlled oscillator means to the non-linear frequency response signal device, a second impedance means, and switching means controlled by said first means for selectively connecting said second impedance means in shunt with said first impedance means in accordance with the potential level of the signal generated by said first means.

5. A controlled amplitude signal generator comprising oscillator means including an output for transmitting an alternating signal having a given amplitude, signal generating means including an output for transmitting a signal shifting between first and second potential levels, a first resistor including a first terminal connected to the output of said oscillator means and a second terminal, a second resistor including a first terminal connected to the second terminal of said first resistor and a second terminal, and a unilateral conducting device for connecting the second terminal of said second resistor to the output of said signal generating means, said unilateral conducting device being so polarized that when the signal generated by said signal generating means is at the first potential level, said unilateral conducting device is conducting and when said signal is at the second potential level, said unilateral conducting device is non-conducting.

6. A controlled amplitude signal generator comprising oscillator means including an output for transmitting an alternating signal having a given amplitude, signal generating means including output means for transmitting signals shifting between first and second potential levels, a first resistor including a first terminal connected to the output of said oscillator means and a second terminal, a second resistor including a first terminal connected to the second teminal of said first resistor and a second terminal, a first unilateral conducting device including a first terminal connected to the second terminal of said second resistor and a second terminal connected to the output means of said signal generating means, a third resistor including a first terminal connected to the second terminal of said first resistor, and a second unilateral conducting device including a first terminal connected to the second terminal of said third resistor and a second terminal connected to the input means of said signal generating means, said unilaterally conducting devices being oppositely polarized and simultaneously conducting and simultaneously non-conducting in response to signals received from said signal generating means whereby the signal generated by said oscillator means is controllably attenuated without shifting the average voltage level of said signal.

7. For combination with a signal device having a non-linear frequency response wherein for a given amplitude input signal the signal device transmits a signal having a first amplitude when the input signal has a first frequency and transmits a signal having a second and lesser amplitude when said input signal has a second frequency, a controlled amplitude input signal generator comprising a voltage controlled oscillator, said voltage controlled oscillator including a control input for receiving a signal shifting between first and second potential levels and an output for transmitting a first frequency signal when the signal at said control input is at said first potential level and for transmitting a second frequency signal when the signal at said control input is at said second potential level, and a controlled signal attenuator means connecting the output of said voltage controlled oscillator to the signal device, said controlled signal attenuator means including a control input for receiving said signals shifting between first and second potential levels to control said attenuator means for attenuating the first frequency signals transferred from said voltage controlled oscillator to said signal device when the signal at the control input of said attenuator means is at said first potential level.

8. For combination with a non-linear frequency response signal device wherein in response to a given amplitude input signal the non-linear frequency response signal device transmits a signal having a first amplitude when the input signal has a first frequency and transmits a signal having a second and lesser amplitude when said input signal has a second frequency a controlled amplitude input signal generator comprising first means for generating a signal shifting between first and second potential levels, an oscillator means comprising first and second signal amplifier means each including input, output and common terminals, means for applying operating voltages to said common and output terminals, a first capacitor connecting the output terminal of said first signal amplifier to the control terminal of said second signal amplifier, a second capacitor connecting the output terminal of said second signal amplifier to the control terminal of said first signal amplifier, first and second resistors each having first and second terminals, the first terminals of said resistors being connected to the control terminals of said signal amplifiers respectively, the second terminals of said resistors being connected together, third and fourth resistors including first and second terminals, means for applying a voltage to the first terminals of said third and fourth resistors, a unilateral conducting device connecting the second terminals of said third and fourth resistors, means for connecting the second terminals of said first and second resistors to the second terminal of said third resistor, means for connecting the second terminal of said fourth resistor to said first means, said unilateral conducting device being so polarized that only when said first means transmits a signal having the second potential level said unilateral conducting device conducts, and a controlled attenuator means connecting the output terminal of said second signal amplifier to said signal device, said controlled attenuator means including a control terminal connected to said first means for limiting the amplitude of the signal transmitted from said oscillator means only when said first means generates a signal having the first potential level.

9. For combination with a non-linear frequency response signal device wherein in response to a given amplitude input signal the non-linear frequency response signal device transmits a signal having a first amplitude when the input signal has a first frequency and transmits a signal having a second and lesser amplitude when said input signal has a second frequency, a controlled amplitude input signal generator comprising first means for generating a signal shifting between first and second potential levels, an oscillator means comprising first and second signal amplifier means each including input, output and common terminals, means for applying operating voltages to said common and output terminals, a first capacitor connecting the output terminal of said first signal amplifier to the control terminal of said second signal amplifier, a second capacitor connecting the output terminal of said second signal amplifier to the control terminal of said first singal amplifier, first and second resistors each having first and second terminals, the first terminals of said resistors being connected to the control terminals of said signal amplifiers respectively, the second terminals of said resistors being connected together, third and fourth resistors including first and second terminals, means for applying a voltage to the first terminals of said third and fourth resistors, a unilateral conducting device connecting the second terminals of said third and fourth resistors, means for connecting the second terminals of said first and second resistors to the second terminal of said third resistor, means for connecting the second terminal of said fourth resistor to said first means, said unilateral conducting device being so polarized that only when said first means transmits a signal having the second potential level said unilateral conducting device conducts, and a controlled attenuator including a fifth resistor for connecting the output terminal of said second signal amplifier to the signal device, a sixth resistor including a first terminal connected to the junction of said fifth resistor and the signal device and a second terminal, and a second unilateral conducting device connecting the second terminal of said sixth resistor to said first means, said second unilateral conducting device being so polarized to conduct only when the signal generated by said first means is at the first potential level.

References Cited

UNITED STATES PATENTS

| | | | |
|---|---|---|---|
| 2,632,101 | 3/1953 | Quarles | 325—61 |
| 3,200,351 | 8/1965 | Ritchey | 331—145 X |
| 3,293,569 | 12/1966 | Englund et al. | 331—145 X |

ROBERT L. GRIFFIN, *Primary Examiner.*

J. T. STRATMAN, *Assistant Examiner.*

U.S. DEPARTMENT OF COMMERCE

PATENT OFFICE

Washington, D.C. 20231

UNITED STATES PATENT OFFICE

Certificate

Patent No. 3,408,572 Patented October 29, 1968

Edgar Wolf and Francis C. Marino

Application having been made by Edgar Wolf and Francis C. Marino, the inventors named in the patent above identified, and Digitronics Corporation, Albertson, N.Y., a corporation of Delaware, the assignee, for the issuance of a certificate under the provisions of Title 35, Section 256, of the United States Code, deleting the name of Edgar Wolf as a joint inventor, and a showing and proof of facts satisfying the requirements of the said section having been submitted, it is this 17th day of November 1970, certified that the name of the said Edgar Wolf is hereby deleted from the said patent as a joint inventor with the said Francis C. Marino.

FRED W. SHERLING
*Associate Solicitor.*